United States Patent [19]

Huber

[11] 4,235,369
[45] Nov. 25, 1980

[54] PLANT FOR SPACE HEATING AND SERVICE WATER HEATING

[75] Inventor: Rudolf Huber, Winterthur, Switzerland

[73] Assignee: Sulzer Brothers Limited, Winterthur, Switzerland

[21] Appl. No.: 950,288

[22] Filed: Oct. 11, 1978

[30] Foreign Application Priority Data

Oct. 12, 1977 [CH] Switzerland .................. 12443/77

[51] Int. Cl.³ ............................................. F25B 29/00
[52] U.S. Cl. ................................. 237/2 B; 62/238 E; 126/427
[58] Field of Search .............. 62/238 E; 237/2 B, 59, 237/8 C, 8 R, 19; 122/37, 20, 83, 123, 33; 219/314; 126/427

[56] References Cited

U.S. PATENT DOCUMENTS

| | | | |
|---|---|---|---|
| 1,874,803 | 8/1932 | Reed | 62/238 |
| 1,937,288 | 11/1933 | McGraw | 62/238 |
| 3,720,189 | 3/1973 | Meyers | 122/33 |
| 3,984,050 | 10/1976 | Gustafsson | 62/238 X |
| 3,996,759 | 12/1976 | Meckler | 237/1 A X |

Primary Examiner—William E. Wayner
Assistant Examiner—Henry Bennett
Attorney, Agent, or Firm—Kenyon & Kenyon

[57] ABSTRACT

A plant for space heating and service-water heating, is comprised of a combination boiler and a heat pump. The boiler has a first water chamber adapted to be heated by a furnace and/or a heating insert, a second water chamber which communicates with the first chamber and which contains a heat-exchange surface for heating service water, and a third water chamber containing a heat-exchange surface (36, 36a, 38) for preheating cold service water. A circuit is connected to the third water chamber in the lowest water temperature zone, by means of which, when the heat pump is in operation, water can be fed to the condenser section of the heat pump and, after the water has heated up, be returned to the second water chamber. The third water chamber communicates at least with the second water chamber.

23 Claims, 8 Drawing Figures

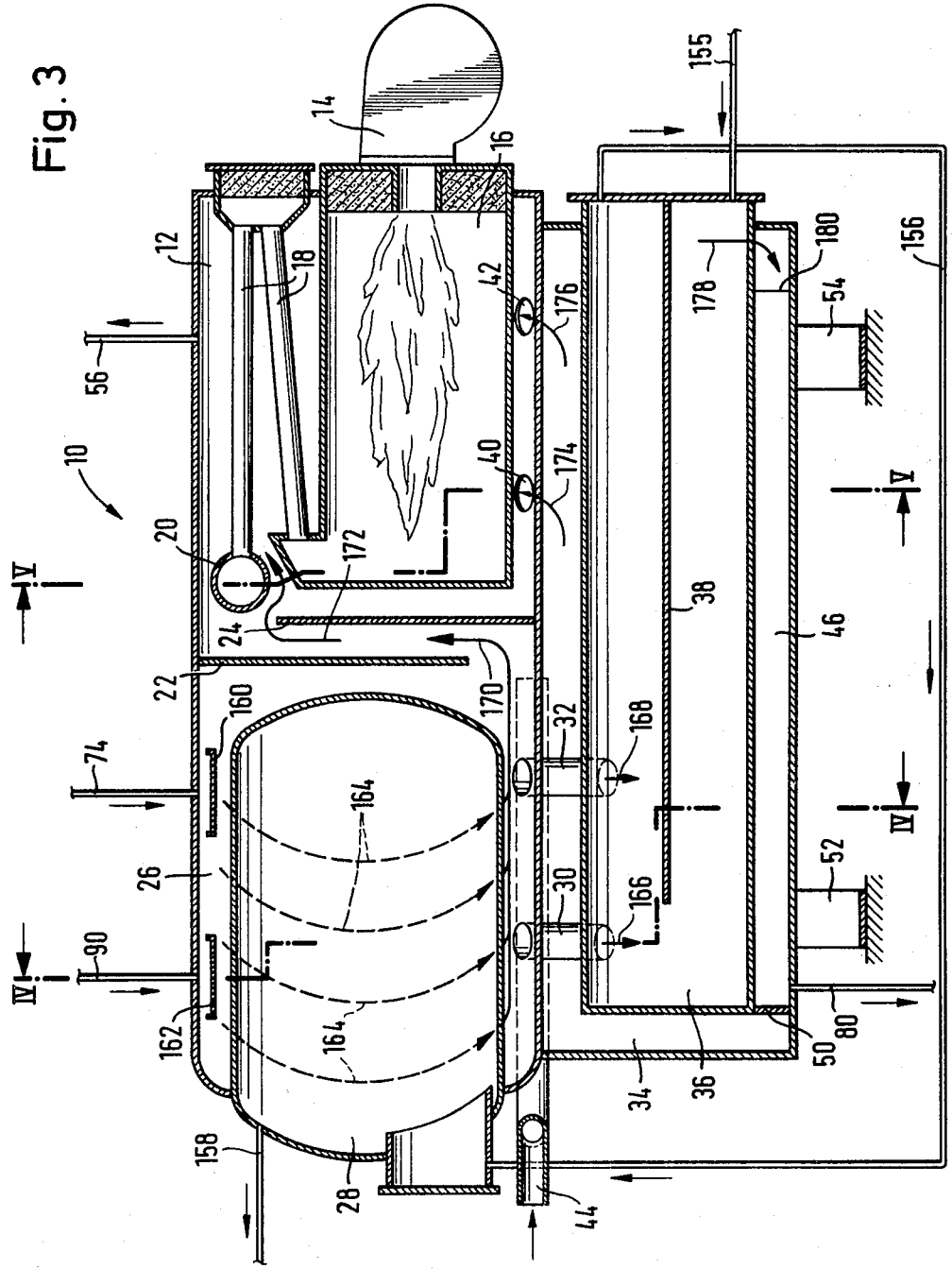

PLANT FOR SPACE HEATING AND SERVICE WATER HEATING

This invention relates to a plant for space heating and service water heating.

As is known, various types of plants have been constructed both for space heating purposes and service water heating purposes. In some cases, these plants have been constructed of a combination boiler and a heat pump. The boiler usually has a first water chamber adapted to be heated by a furnace and/or a heating insert and a second water chamber which communicates with the first chamber and contains a heat-exchange surface for heating service water.

In plants of this kind, the heat pump serves to heat service water during periods when no space heating is required, and also for space heating during transitional periods, and to add to the space heating and service water heating capacity of the combination boiler during the rest of the year. According to the prior art, these functions of the heat pump are achieved, for example, by connecting the heat pump for direct heating of a hot-water storage tank, the water from the secondary side of the heat pump conventionally being taken through a coil disposed in the hot-water storage tank. Here, and hereinafter, the evaporator side of the heat pump will be referred to as the primary side and the condenser side as the secondary side. The heat pump may also be connected on the secondary side to a separate hot-water storage tank which is, in turn, connected for heating the service water storage tank and communicates with a space-heating section of the plant. Corresponding combinations are also conventional in which the heat pump is connected on the secondary side both to the service hot-water storage tank and to a separate hot-water storage tank.

However, these previously known plants have various disadvantages. For example, if the heat pump is connected only for heating the service hot-water storage tank, the time during which the heat pump is in operation is short. This is because the service hot-water storage tank is rapidly heated up due to a relatively small volume. There is also the risk that the water circulating back to the heat pump will have a relatively high temperature. This would result in an impermissible pressure rise in the heat pump working medium circuit. The consequent short periods of operation of the heat pump mean that it is utilized inadequately, while in addition high input temperatures on the secondary side greatly reduce the heat pump efficiency. In both cases, therefore, the cost/profit ratio of the heat pump deteriorates, and is economically unacceptable because of the high installation costs for a heat pump. This has, in practice, previously prevented wider use of the heat pump which both reduces pollution and saves energy.

If the heat pump is connected on the secondary side to a separate hot-water storage tank, the above disadvantages are reduced. However, there are other disadvantages instead. First, a separate hot-water storage tank results in a very complicated plant with a large number of control valves, changeover and connecting pipes, and a correspondingly extensive control system. Second, the plant has to be shipped in the form of a number of individual components to the place of installation, where the plant is assembled, fitted and put into operation at great expense. The resulting plant is of course very bulky and expensive to maintain. In addition, the insulation costs of such a plant are considerable.

Accordingly, it is an object of the invention to provide a plant for space heating and service water heating which satisfies the conditions for optimum operation and utilization of a heat pump.

It is another object of the invention to provide a plant which uses a combination boiler and a heat pump which is capable of long periods of operation.

It is another object of the invention to provide a relatively simple and compact plant utilizing a combination boiler and heat pump.

It is another object of the invention to provide a plant for space heating and service water heating which requires a relative minimum of components.

It is another object of the invention to utilize a heat pump within a heating plant under low water temperatures together with large storage capacities.

It is another object of the invention to provide a plant utilizing a combination boiler and heat pump which is operationally reliable.

Briefly, the invention provides a plant for space heating and service water heating. The plant is comprised of a combination boiler and a heat pump.

The combination boiler has a first water chamber for receiving water to be heated, a second water chamber communicating with the first chamber to receive heated water therefrom, a first heat exchange surface in the second chamber for conveying a flow of service water therethrough in heat exchange relation with the heated water in the second chamber, a third water chamber in communication with at least the second water chamber to receive heated water and a second heat exchange surface in the third water chamber. This second heat exchange surface is connected in series with the first heat exchange surface relative to the flow of service water for preheating the flow of service water.

The heat pump has a condensor section for conveying a heated medium therethrough as well as an evaporator section upstream of the condensor relative to the flow of heated medium. The heat pump is utilized, for example, in combination with a solar collector which serves to preheat air for delivery to the evaporator in heat exchange with the heated medium.

In addition, the plant has a circuit which is connected between the third water chamber of the combination boiler, the condensor section of the heat pump and the second water chamber of the combination boiler. This circuit serves to convey a flow of heated water from the third water chamber into heat exchange relation with the heated medium in the condensor and subsequently into the second water chamber.

The combination boiler may utilize a furnace or a heating insert in the first water chamber in order to heat up water within the chamber. In similar fashion, the third water chamber may also be provided with a heater insert, for example in the form of an electrical heating element or in the form of a heat exchange element having at least one heat exchange surface with a primary side for receiving a heating medium from an independent source.

As a result of this construction, a large storage volume is available on the secondary side for the heat pump without the disadvantages of a separate hot-water storage tank in respect of space, circuitry, control valves and the like. Since the third water chamber communicates directly with the second water chamber, the pipes and control valves hitherto required are eliminated.

Another effect of the direct communication between these two water chambers is that the volume of the third water chamber can be kept smaller than the separate storage tank hitherto necessary, because the second water chamber is also used as a hot-water storage tank for the heat pump.

As a result of a direct transfer from the second water chamber to the third water chamber by a means which represses convection flow between the second and third water chambers, a temperature differentiation can occur between the second and third water chambers during operation of the heat pump. Consequently, the volume of the entire plant is reduced and the plant is more compact.

The effect of preheating cold service water in the third water chamber, which acts preferably as a storage tank for layers of water, is that the water from the third water chamber has a relatively low temperature for the heat pump input on the secondary side. The heat pump can thus operate with a longer period of operation and at high efficiency.

According to a very advantageous embodiment of the invention, the third water chamber also communicates directly with the first water chamber. Another advantage of this integration of the water chambers is that relatively hot water flows through the furnace during those periods of the year when no space heating is required, as a result of operation of the heat pump. This effects a considerable reduction of corrosion due to reduced condensation in the furnace.

Another advantage is that the arrangement of the water chambers enables space heating or service-water preheating to be installed with a connection for an independent heat source in the third water chamber at low expenditure.

These and other objects and advantages of the invention will become more apparent from the following detailed description and appended claims taken in conjunction with the accompanying drawings in which:

FIG. 1 diagrammatically illustrates a plant according to the invention in partial longitudinal section, with an oil-fired boiler;

FIG. 2 diagrammatically illustrates a heat pump and solar collector usable in the plant according to the invention;

FIG. 3 illustrates a detailed view of the combination boiler according to FIG. 1 in longitudinal section;

Figure 1:
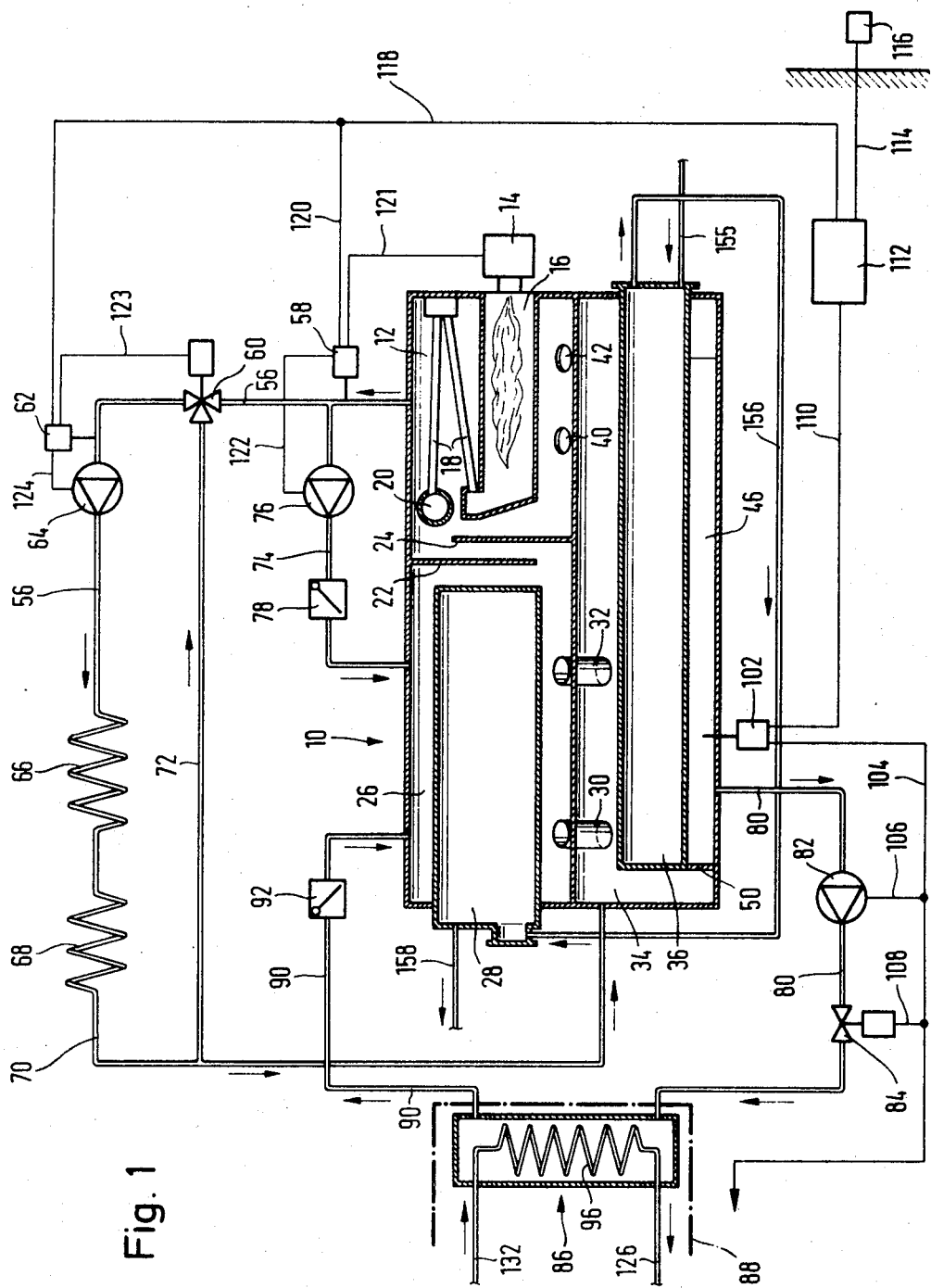
Figure 5:
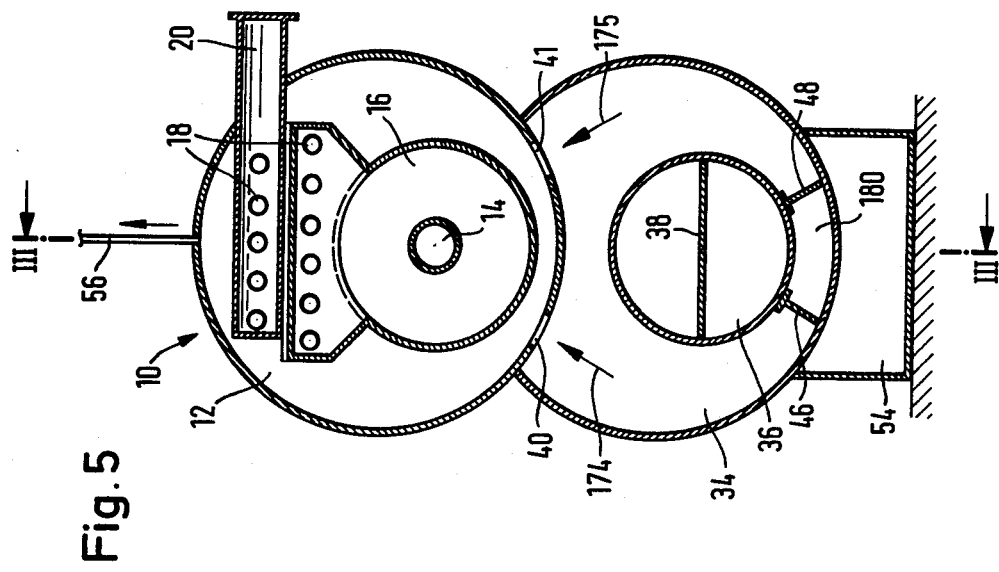
FIG. 5 illustrates a view taken on line V—V of FIG. 3.
Figure 4:
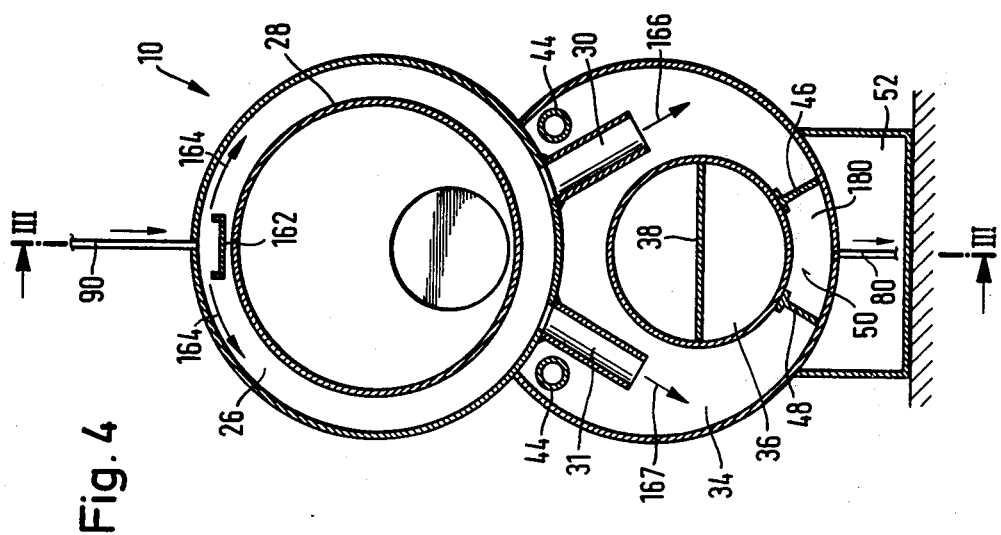
FIG. 4 illustrates a view taken on line IV—IV of FIG. 3.

Referring to FIG. 1, the plant for space heating and service water heating has a combination boiler 10 which comprises a first water chamber 12 heated by an oil burner 14, a furnace or combustion chamber 16, smoke gas tubes 18 and a smoke gas flue 20. The first water chamber 12 receives water to be heated and communicates via baffle plates 22 with a second water chamber 26 to receive heated water therefrom (see FIG. 2). The second chamber 26 contains a heat-exchange surface in the form of a boiler 28 for heating up service water in heat exchange with the water in the chamber 26. The second water chamber 26 also communicates via means such as pairs of spigots 30, 31, 32 with a third water chamber 34, which contains a service water preheater 36 as a heat exchange surface for preheating cold service water. This preheater 36 has a partition 38 (FIGS. 4 and 5) and is adapted to communicate with the first water chamber 12 via openings 40, 41, 42 (FIGS. 3 and 5). A forked tube 44 (FIG. 3) is also disposed in the third water chamber 34 and extends to approximately the middle of the water chamber 34. The service water preheater 36 is borne on members 46, 48 which are connected at one end by a plate 50. The entire combination boiler 10 is borne on supports 52, 54 (FIG. 3).

As shown in FIG. 1, a heating flow pipe 56 containing a boiler thermostat 58 leads from the water chamber 12 via a mixing valve 60, a heating flow thermostat 62, and a circulating pump 64, to a plurality of radiators 66, 68 of a space heating system. The radiators 66, 68 are connected to the forked tube 44 via a heating return pipe 70. The pipe 70 is also connected to the mixer valve 60 via a bypass pipe 72. A pipe 74 also runs from the heating flow pipe 56 via a circulating pump 76 and a non-return valve 78 to the second water chamber 26. The direction of the flow in the pipes is indicated by arrows.

The plant has a heat pump 88 (FIGS. 1 and 2) which includes a condensor section 86 for conveying a heated medium. As shown in FIG. 1, a circuit is connected between the water chamber 34, and the condenser section 86 and the water chamber 26 for conveying a flow of heated water from the chamber 34 into heat exchange relation with the heated medium in the condensor 86 and subsequently into the second water chamber 26. As indicated, the circuit has a pipe 80 which extends from the third water chamber 34 to the condenser 86 via a circulating pump 82 and a stop valve 84. The condensor 86 is connected to the second water chamber 26 via a pipe 90 and a non-return valve 92. The third water chamber 34 also has a stop thermostat 102 for the heat pump 88. The thermostat 102 serves to sense the temperature of the water in the chamber 34 and to shut off the heat pump 88 in response to a predetermined water temperature being exceeded in the water chamber 34. The thermostat is connected to the heat pump 88 via a signal line 104 and to the circulating pump 82 and the stop valve 84 via branch signal lines 106, 108, respectively. A signal line 118 having a branch signal line 120 connects the central control unit 112 to the boiler thermostat 58 and to the heating flow thermostat 62. Signal lines 121, 122 lead from the boiler thermostat 58 to the oil burner 14 and to the circulating pump 76 respectively, and the heating flow thermostat 62 is connected to the mixer valve 60 and to the circulating pump 64 via signal lines 123 and 124, respectively.

Figure 2:
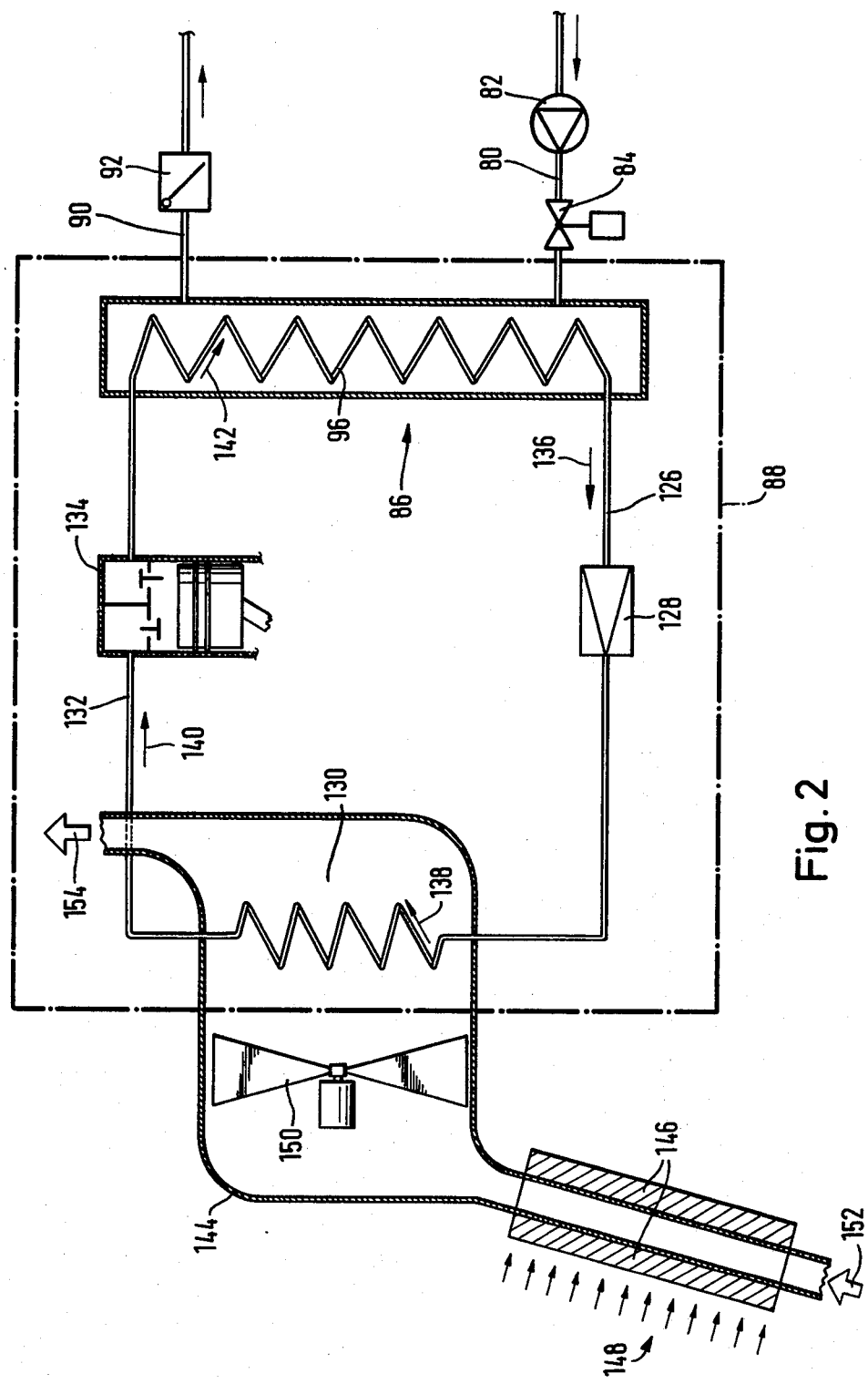

The condensor 86 has a coil 96 for carrying the heat pump working medium and communicates with a pipe 126 which runs to an evaporator 130 via a throttle valve 128 (FIG. 2). From the evaporator, a pipe 132 extends back to the condensor 86 via a compressor 134, the working medium being carried in a closed circuit as shown by arrows 136, 138, 140, 142. Any of the conventional refrigerants may be used as the working medium for the heat pump. The evaporator 130 is disposed in an air duct 144 which is connected to a solar collector 146, which is irradiated with sunlight in the direction of arrows 148. A fan 150 is used to convey air through the solar collector and through the evaporator in the direction of arrows 152 and 154.

The service water preheater 36 has an inlet pipe 155 for cold water and is connected to the boiler 28 by a pipe 156. A service hot water outlet pipe 158 connects to a suitable consumer (not shown). Baffle plates 160, 162 (FIG. 3) are disposed in the second water chamber 26 beneath the openings of the pipes 74, 90 to deflect incoming water. The direction of flow of the water in the second water chamber 26 is over the outer wall of the boiler 28 and is denoted by arrows 164 (FIG. 3). The directions of flow from the second water chamber 26 to the third water chamber 34, and to the first water chamber 12, are indicated by the arrows 166, 167, 168 and 170, 172 respectively. The water can flow from the third water chamber 34 into the first water chamber 12 in the direction of arrows 174, 175, 176. As seen from FIGS. 3 and 4, the spigots 30, 31, 32 used as transfer means extend down laterally beyond the service water preheater 36 to repress convection flow between the second and third water chambers. The water transfer to the third water chamber is by laminar flow. Consequently, a temperature differential can occur between the second and third water chambers 26, 34 during operation of the heat pump 88.

The third water chamber 34 acts as a storage tank for layers of water, the layer of water forming in the bottom part thereof being as cool as possible. The arrow 178 shows the direction of flow to a duct 180, which is formed by the members 46, 48 together with the bottom wall of the service water preheater 36 and the connecting plate 50, and which is closed at one end, the pipe 80 being disposed at said closed end.

Figure 6:
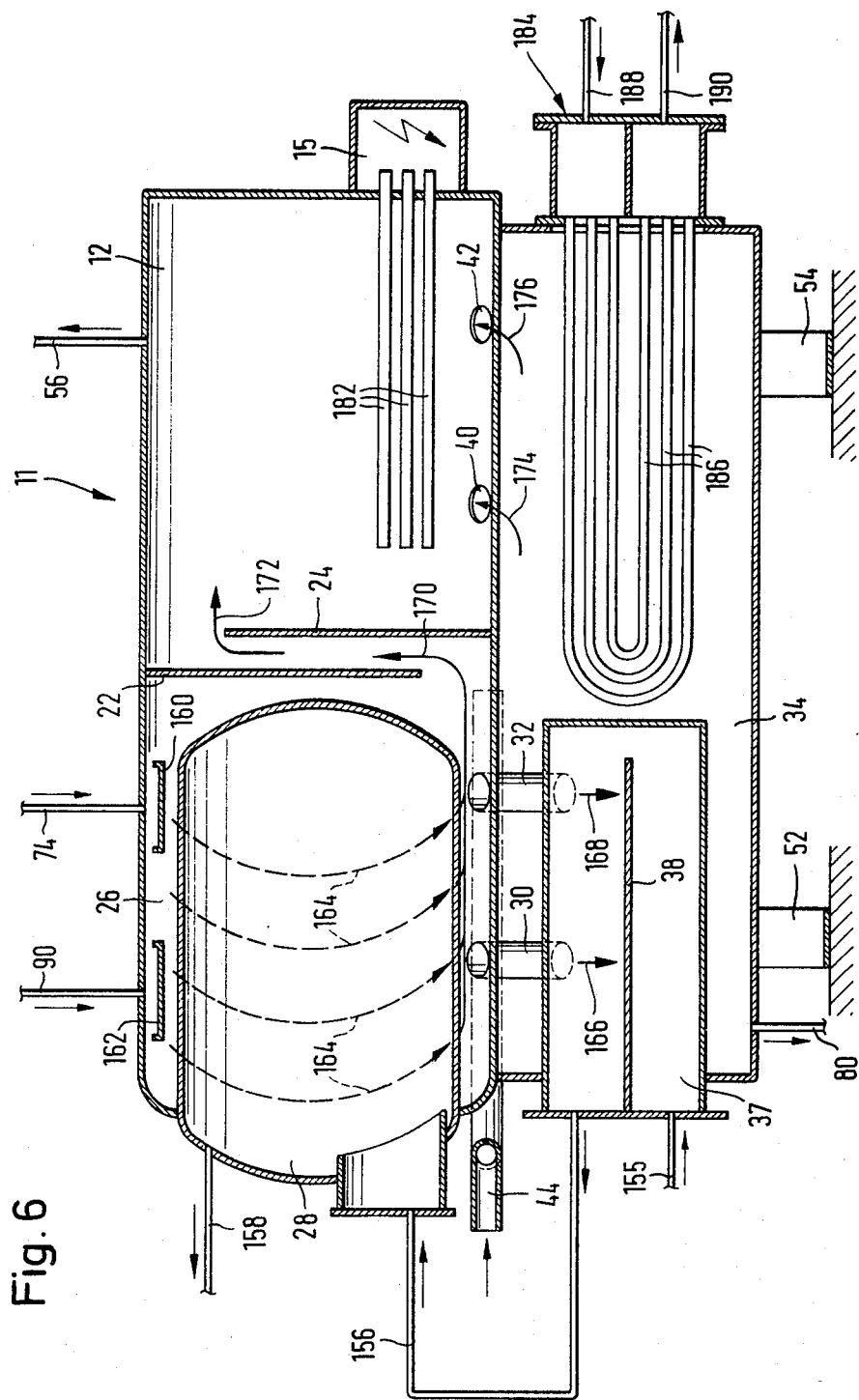
FIG. 6 illustrates a view similar to FIG. 3 of a modified boiler in accordance with the invention.

Referring to FIG. 6 wherein like reference characters indicate like parts as above, the combination boiler 11 may alternatively use an electric heater 15 provided with heater elements 182 which extend into the first water chamber 12. In addition to a shortened service water preheater 37, a heater insert or heat-exchange member 184 having an independent heat source (not shown) is provided for the preheater 37. This heat-exchange member 184 has a heat-exchange surface in the form of hairpin-shaped heat-transfer tubes 186 within the third water chamber 34 as well as an entry pipe 188 and an exit pipe 190. Remote heating operated, for example, by steam or hot water, may be used as the independent heat source for the heat-exchange element 184.

Figure 7:
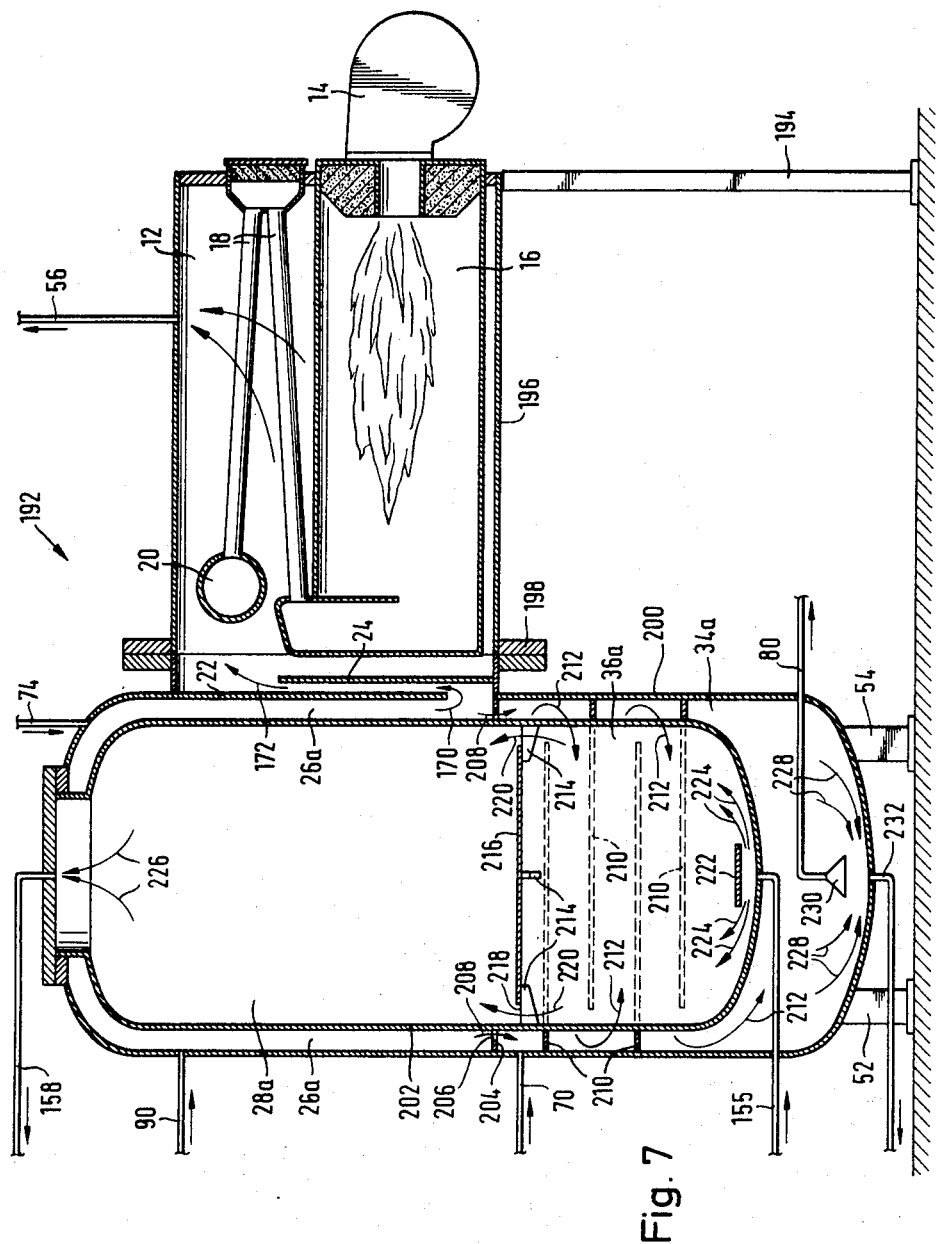
FIG. 7 illustrates a view of a modified plant in accordance with the invention.

Referring to FIG. 7, wherein like reference characters indicate like parts as above, the plant may be constructed with a combination boiler 192 consisting of a horizontal furnace part 196 borne on a support 194, and a vertical storage tank 200 connected thereto via a detachable flange connection 198. As shown, the furnace part 196 has a first water chamber. In addition, a vessel 202 i.e. a boiler, is disposed substantially concentrically in the tank 200. An annular plate 204 fixed on the inner wall of the storage tank 200 divides the annular space between the storage tank 200 and the vessel 202 into a top part 26a forming a second water chamber, and a bottom part 34a forming a third water chamber. The tubular spigots 30, 31, 32, in this case, are replaced by an annular gap 206 which acts as a transfer means between the water chambers, the direction of flow of the water through the annular gap being indicated by the arrows 208. Baffle plates 210 are also provided in the annular part of the water chamber 34a and cause the water to flow around the vessel 202 in the direction indicated by the arrows 212.

A partition 216 rests on brackets 214 in the vessel 202 to divide the vessel into a top part 28a which corresponds to the boiler 28 and which serves as an end stage, and a bottom part 36a corresponding to the service water preheater 36. An annular gap 218 serves as a transfer means for the water between these parts 28a, 36a which flows in the direction indicated by the arrows 220. A baffle plate 222 at the bottom part of the boiler laterally distributes the cold service water arriving from a pipe 155, in the direction indicated by the arrows 224. The finally heated service water flows away from the boiler end stage in the direction indicated by the arrows 226. In the bottom part of the water chamber 34a, the water flows off in the direction of arrows 228 to the heat pump via the pipe 80. For this purpose, the inlet of the pipe 80 has a suction nozzle 230. A pipe 232 serves for emptying the storage tank 200 for cleaning and maintenance work.

Figure 8:
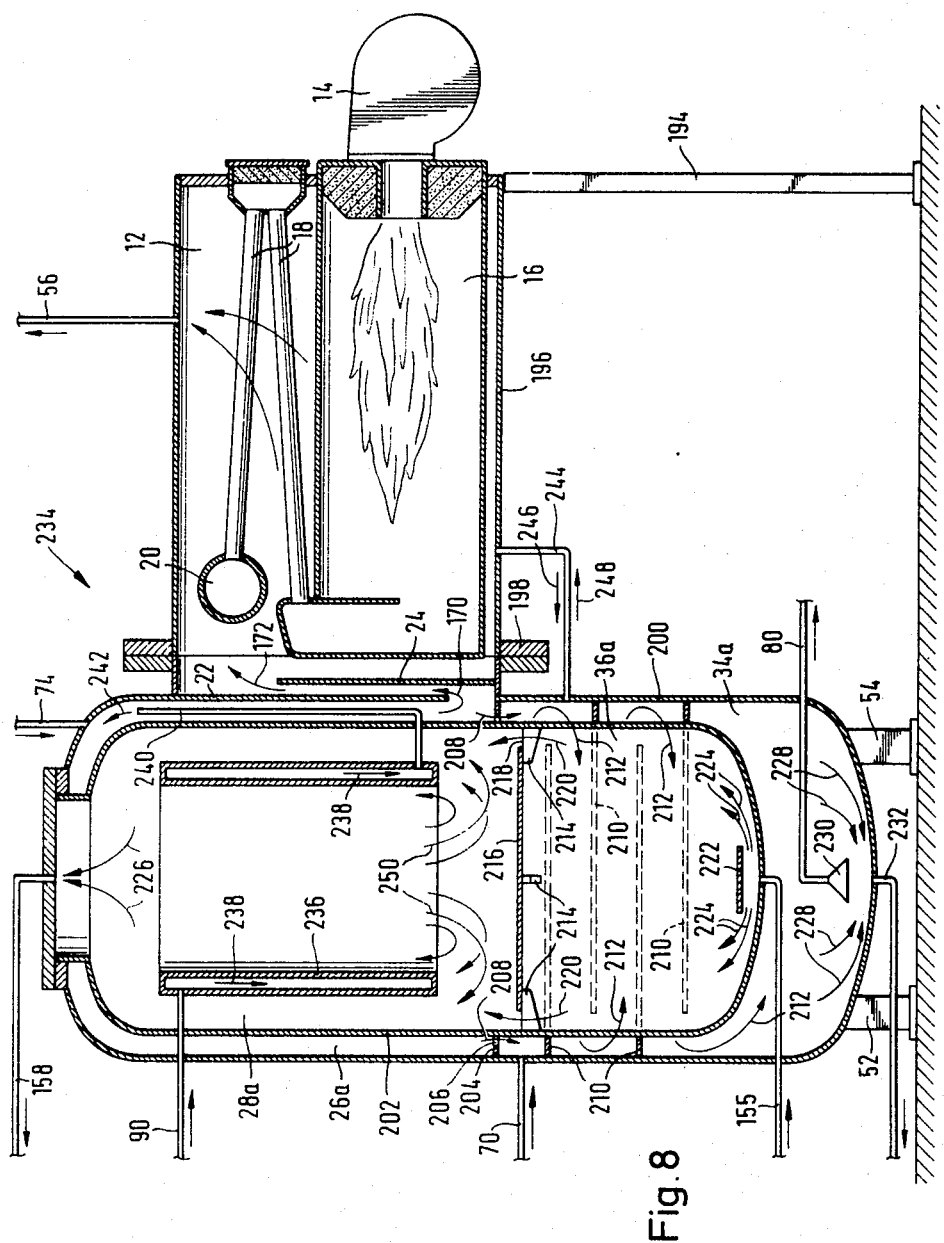
FIG. 8 illustrates a view of a further modified plant in accordance with the invention.

Referring to FIG. 8, wherein like characters indicate like parts as above, the combination boiler 234 may be constructed so that the water fed to the storage tank 200 from the heat pump via the pipe 90 is first taken through a double jacket 236 disposed substantially concentrically in the vessel 202, in the direction indicated by the arrows 238, and flows through a pipe 240 into the top part of the annular water chamber 26a in the direction of arrow 242. A pipe 244 may be provided, through which there may be a flow in both directions as shown by arrows 246, 248 between the first water chamber 12 and the third water chamber 34a, e.g. in the event of inadequate water circulation in the boiler, which might result in local overheating.

The plant described in FIGS. 1 to 5 operates as follows:

During summer operation (example of operation 1, external air temperature above approximately +15° C., service water heated by means of heat pump), the mixer valve 60 is closed and the circulating pumps 64, 76 and oil burner 14 are rendered inoperative by way of the central control unit 112 after operation of the external thermostat 116. The stop valve 84 is opened and the circulating pump 82 and heat pump 88 are started. The circulating pump 82 delivers water in this case from the third water chamber 34 via the pipe 80 to the condenser 86 of the heat pump 88 and, after heating to a temperature of about 55°-60° C., to the second water chamber 26 via the pipe 90. The incoming water is intercepted by the baffle plate 162 and now flows with a substantially laminar flow in the direction indicated by the arrows 164 over the outer wall of the boiler 28 and then through the spigots 30, 31, 32 back into the third water chamber 34. The water flows in the direction of arrows 166, 167, 168 (FIG. 3) with substantially laminar flow over the outer wall of the service water preheater 36 and after appropriate cooling, flows in the direction of arrow 178 into the duct 180, from which the water is again fed to the heat pump 88 by the pipe 80.

The cold service water passes through pipe 155 to the service water preheater 36 and, after appropriate preheating, flows via pipe 156 to the boiler 28. The service water is then heated to a service temperature of about 50° C. and is withdrawn via the pipe 158 as required.

The heat pump 88 operates as follows:

From the condenser 86, the working medium of the heat pump 88 circulates to the evaporator 130 (FIG. 2). The fan 150 heats the working medium by means of a hot air flow from the solar collector 146. The working medium heated and evaporated in the evaporator 130 then flows via the pipe 132 to the compressor 134 and back to the condenser 86 after appropriate compression. The working medium condenses in the coil 96, heat being transferred to the water entering via pipe 80 and leaving via pipe 90.

The heat pump evaporator 130 could, of course, be operated just by means of the ambient air, without a solar collector, or by means of ground-water, and so on. However, operation with the solar collector enables solar energy to be used in a simple manner.

During spring and autumn operation (example of operation 2, external air temperature between about +15° C. and about +2° C., service water heating and space heating by means of the heat pump), the operation conditions are identical to those in example 1 except that, in addition, the mixer valve 60 is opened and the circulating pump 64 is in operation. In this case, the pump 64 delivers water from the first water chamber 12 to the third water chamber 34 via the flow pipe 56, radiators 66, 68, return pipe 70 and forked pipe 44. Depending upon the control provided by the flow thermostat 62, some of the water flows from the return pipe 70 to the mixer valve 60 via the bypass pipe 72. Depending upon the water temperature and relative flows, water can be transferred to the first water chamber 12 through the openings 40, 41, 42 in the direction of the arrows 174, 175 and 176. Similarly, water can pass from the second water chamber 26 to the first water chamber 12 via the transfer point between the baffle plates 22, 24. A certain circulation in the opposite direction is also possible.

If a considerable amount of service water is required for some reason, e.g. if a number of baths are to be drawn simultaneously or directly one after the other, the oil burner 14 and the circulating pump 76 are started by way of a time pulse circuit incorporated in the central control unit 112 and controlled by the boiler thermostat 58. In that case, the circulating pump 76 additionally delivers heated water from the first water chamber 12 to the second water chamber 26 via the pipe 74.

In mid-winter operation (example of operation 3, external air temperature between about +2° C. and −2° C., parallel operation of heat pump and oil burner), the operating conditions are identical to example 2 except that the running times of the oil burner 14 and circulating pump 76 are lengthened accordingly. If no hot service water is withdrawn for some time, water can be mixed in the third water chamber 34 with a corresponding temperature rise. In such cases, when the permissible heat pump input temperature is exceeded, the stop thermostat 102 will render the heat pump 88 and the circulating pump 82 inoperative and close the stop valve 84.

In operation under severe winter conditions (example of operation 4, external air temperature below about −2° C.), the operating conditions are identical to example 3 except that the central control unit 112, after control by the external thermostat 116, permanently disconnects the heat pump 88 and the circulating pump 82 and closes the stop valve 84. It would no longer be economic to run the heat pump at this external temperature.

In the case of operation with heat from an external source (example of operation 5), the operating conditions are identical to example 4 except that the heat-exchange element 184 and the electric heater 15 are in operation instead of the oil burner 14. Of course, the heater 15 in the third water chamber 34 could also be constructed as an electrical heating element.

The location of the third water chamber 34 beneath the first water chamber 12 results in a considerable reduction of corrosion in the furnace or combustion chamber 16, particularly as a result of the openings 40, 41, 42, which regulate the temperature of the combustion chamber. Even without such openings, optimum temperature regulation is achieved by thermal convection as a result of the partition between the first and third water chambers.

The operation of the combination boiler 192 shown in FIG. 7 corresponds basically to the operation of the combination boiler 10, 11 described with reference to FIGS. 1 and 3–6, although the vertical and substantially concentric arrangement of the second and third water chambers 26a and 34a, and of the boiler end stage 28a and of the service water preheater 36a gives not only more favorable flow conditions, but also simpler piping and connections between the water chambers. The heated water supplied from the heat pump via the pipe 90 flows through the annular water chamber 26a through the outer wall of the boiler end stage 28a and heats up the service water flowing through the boiler and flows partly in the direction of arrows 208 through the annular gap 206 into the third water chamber 34a and partly, as described above, in the direction of arrows 170, 172, to the first water chamber 12. Together with the relatively cold space-heating return water arriving from pipe 70, the water flows downwardly over the baffle plates 210 in the direction of the arrows 212, 228 to the suction nozzle 230 of the pipe 80. The incoming cold service water reaching the service water preheater 36a via the pipe 155 is distributed laterally in the direction of arrows 224 by a baffle plate 222 above the outlet of the pipe 155 and flows in the direction of arrows 220 through the annular gap 218 to the boiler end stage 28a. The water is then heated to the temperature of use and flows off through the pipe 158 in the direction of arrows 226.

The operation of the combination boiler 234 shown in FIG. 8 corresponds to that of the last described boiler, although the double jacket 236 not only gives a better utilization of the heat of the water coming from the heat pump through the pipe 90, but also an additional vertical circulation of the water in the boiler end stage 28a in the direction of arrows 250, a very advantageous flow component being obtained along the inner wall of the boiler end stage 28a.

The water exchange between the first water chamber 12 and the third water chamber 34a, which may be effected by the pipe 244, corresponds to that already described with reference to the openings 40, 41, 42.

Of course any heat-exchangers, e.g. coils, may be used for the boiler 28, the boiler end stage 28a, and for the service water preheater 36, 36a, 37.

A heat-exchange element 184 having at least one heat-exchange surface 186 which on the primary side can be supplied with heating media from an independent heat source, can of course also be provided in the water chamber 12 connected to the storage tank 200.

What is claimed is:

1. A plant for space heating and service water heating, said plant comprising
a combination boiler having a first water chamber for receiving water to be heated therein, a second water chamber communicating with said first chamber to receive heated water therefrom, a first heat-exchange surface in said second chamber for conveying a flow of service water therethrough in heat exchange relation with heated water in said second water chamber, a third water chamber in communication with at least said second water chamber to receive heated water therefrom and a second heat-exchange surface in said third water chamber connected in series with said first heat-exchange surface relative to the flow of service water for pre-heating the flow of service water;

a heat pump having a condenser section therein for conveying a heated medium therethrough; and a circuit connected between said third water chamber, said condenser section and said second water chamber for conveying a flow of heated water from said third water chamber into heat exchange relation with the heated medium in said condensor and subsequently into said second water chamber.

2. A plant as set forth in claim 1 wherein said boiler further has a furnace disposed in said first water chamber.

3. A plant as set forth in claim 1 wherein said boiler further has a heating insert in said first water chamber.

4. A plant as set forth in claim 1 wherein said third water chamber defines a plurality of water temperature zones and said circuit is connected to the lowest water temperature zone.

5. A plant as set forth in claim 1 wherein said boiler further has a pipe communicating said first water chamber to said second water chamber and a circulating pump in said pipe to pump water therethrough from said first water chamber to said second water chamber.

6. A plant as set forth in claim 1 wherein said third water chamber is disposed beneath said second water chamber.

7. A plant as set forth in claim 1 which further comprises a space heating system for receiving a heated flow of water from said first water chamber, said system having a return pipe connected to a top part of said third water chamber.

8. A plant as set forth in claim 7 wherein said return pipe connects with a forked pipe in said third water chamber above said second heat-exchange surface.

9. A plant as set forth in claim 1 which further comprises a stop thermostat for sensing the temperature of the water in said third water chamber, said thermostat being connected to said heat pump for shutting off said heat pump in response to a predetermined water temperature being exceeded in said third water chamber.

10. A plant as set forth in claim 1 wherein said boiler further has a heater insert in said third water chamber.

11. A plant as set forth in claim 10 wherein said insert is an electrical heating element.

12. A plant as set forth in claim 10 wherein said insert is a heat-exchange element having at least one heat-exchange surface with a primary side for receiving a heating medium from an independent source.

13. A plant as set forth in claim 1 wherein said boiler further has means for transferring water directly from said second water chamber to said third water chamber while repressing convection flow whereby a temperature differential occurs between said second and third water chambers with said heat pump in operation.

14. A plant as set forth in claim 13 wherein said means includes a plurality of spigots.

15. A plant as set forth in claim 1 wherein said heat pump includes an evaporator section upstream of said condensor relative to a flow of heated medium therethrough and preheating air to be delivered to said evaporator in heat exchange with the heated medium.

16. A plant as set forth in claim 1 wherein said boiler has a water transfer section between said first and second water chambers.

17. A plant as set forth in claim 1 wherein said second and third water chambers are disposed in a common vertically disposed storage tank.

18. A plant as set forth in claim 17 wherein said first and second heat-exchange surface are disposed in a common vertically disposed vessel within said tank and said second and third water chambers are disposed in an annular gap between said vessel and said tank.

19. A plant as set forth in claim 18 wherein an annular gap separates said first and second heat-exchange surfaces from each other.

20. A plant as set forth in claim 17 wherein an annular gap separates said second and third water chambers from each other.

21. A plant as set forth in claim 20 which further has a plurality of baffle plates are disposed in said third water chamber below said gap.

22. A plant as set forth in claim 17 wherein said boiler further has a detachable connection between said first water chamber and said storage tank.

23. A plant for space heating and service water heating, said plant comprising a combination boiler having a first water chamber for receiving water to be heated therein, a second water chamber communicating with said first chamber to receive heated water therefrom, a first heat-exchange surface in said second chamber being in heat exchange relation with a flow of service water;

a third water chamber in communication with at least said second water chamber to receive heated water therefrom and a second heat-exchange surface in said third water chamber connected in series with said first heat-exchange surface relative to the flow of service water for pre-heating the flow of service water;

a heat pump having a condenser section therein for conveying a heated medium therethrough; and a circuit connected between said third water chamber, said condenser section and said second water chamber for conveying a flow of heated water from said third water chamber into heat exchange relation with the heated medium in said condenser and subsequently into said second water chamber.

* * * * *